US009812886B2

(12) United States Patent
Lih et al.

(10) Patent No.: US 9,812,886 B2
(45) Date of Patent: Nov. 7, 2017

(54) METHOD OF DIAGNOSING BATTERY AND ADAPTIVELY ADJUSTING CHARGING MODES OF THE BATTERY

(71) Applicant: NATIONAL CHUNG SHAN INSTITUTE OF SCIENCE AND TECHNOLOGY, Taoyuan (TW)

(72) Inventors: Wen-Chen Lih, Taoyuan (TW); Chiu-Hua Tseng, Taoyuan (TW); Shiow-Yueh Ma, Taoyuan (TW); Yu-Min Liao, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 178 days.

(21) Appl. No.: 14/973,915

(22) Filed: Dec. 18, 2015

(65) Prior Publication Data

US 2016/0190825 A1      Jun. 30, 2016

(30) Foreign Application Priority Data

Dec. 29, 2014   (TW) .............................. 103145982 A

(51) Int. Cl.
    *H02J 7/04*        (2006.01)
    *H02J 7/16*        (2006.01)
    *H02J 7/00*        (2006.01)

(52) U.S. Cl.
CPC ............ *H02J 7/007* (2013.01); *H02J 7/0052* (2013.01); *H02J 7/04* (2013.01); *H02J 7/045* (2013.01); *H02J 7/047* (2013.01); *Y02B 40/90* (2013.01)

(58) Field of Classification Search
CPC ..................................................... H02J 7/0091
(Continued)

(56) References Cited

U.S. PATENT DOCUMENTS 6,225,780 B1 * 5/2001 Koch .................... H02J 7/0013
                                                                     320/118
6,441,674 B1 * 8/2002 Lin .......................... G01K 7/01
                                                                    327/512
(Continued)

*Primary Examiner* — Yalkew Fantu
(74) *Attorney, Agent, or Firm* — Schmeiser, Olsen & Watts, LLP

(57) ABSTRACT

A method of diagnosing a battery and adaptively adjusting charging modes of the battery includes the steps of initially charging the battery using a constant current mode, wherein the battery is charged by a fix current in the constant current mode; monitoring a deterioration index by a battery management system (BMS), the deterioration index including a highest temperature ($Temp_{max}$), an instantaneous temperature difference ($\Delta Temp$), an instantaneous voltage difference ($\Delta V$), an instantaneous internal resistance ($IR_{max}$), and a state of charge (SoC) of the battery; when Temp exceeds a predetermined temperature threshold, pausing charging the battery; charging the battery by a constant power charging mode when $Temp_{max}$ becomes smaller than 90% of the predetermined temperature threshold, wherein the battery is charged by a fix electric power in the constant power mode; charging the battery by the constant current charging mode when $Temp_{max}$ becomes smaller than 50% of the predetermined temperature thresh old.

12 Claims, 5 Drawing Sheets

Figure 1:
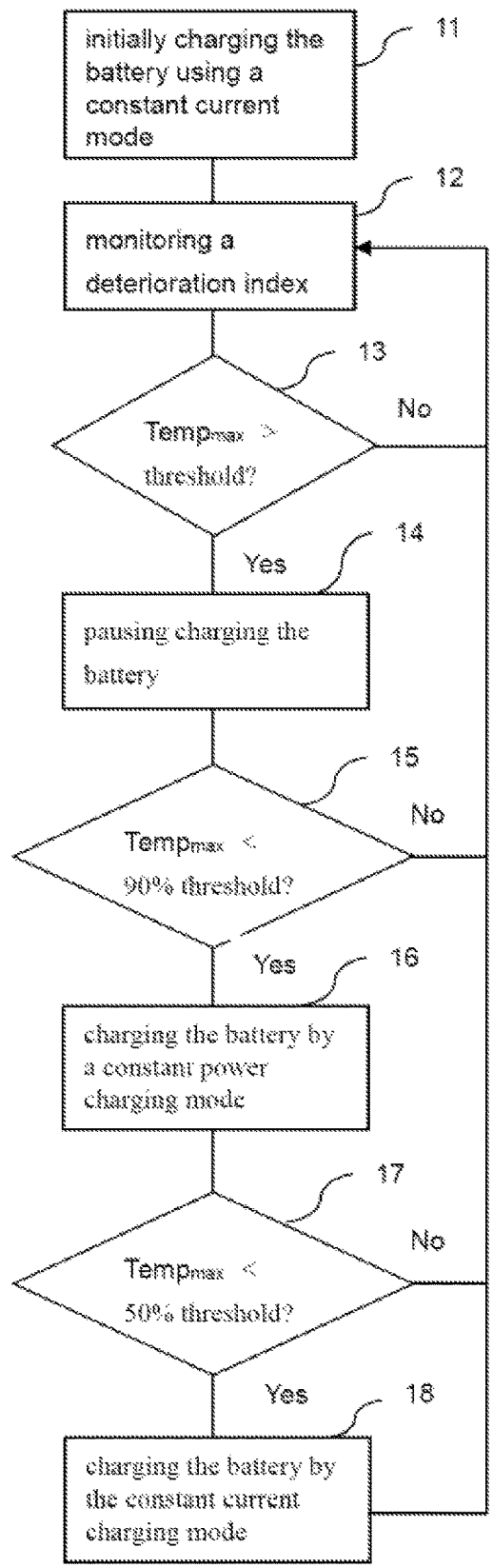

(58) Field of Classification Search
USPC .......................................................... 320/152
See application file for complete search history.

(56) References Cited

U.S. PATENT DOCUMENTS

| | | | |
|---|---|---|---|
| 6,928,381 B2* | 8/2005 | Becker-Irvin | H02J 7/0091 |
| | | | 320/150 |
| 7,492,129 B2* | 2/2009 | Aridome | H01M 10/486 |
| | | | 320/150 |
| 2009/0087725 A1* | 4/2009 | Sim | G01R 1/203 |
| | | | 429/90 |
| 2009/0174369 A1* | 7/2009 | Kawahara | B60L 11/1864 |
| | | | 320/150 |
| 2014/0055143 A1* | 2/2014 | Shieh | G01R 31/3627 |
| | | | 324/426 |

* cited by examiner

METHOD OF DIAGNOSING BATTERY AND ADAPTIVELY ADJUSTING CHARGING MODES OF THE BATTERY

CROSS-REFERENCE TO RELATED APPLICATION

This non-provisional application claims priority under 35 U.S.C. §119(a) on Patent Application No(s). 103145982 filed in Taiwan, R.O.C. on Dec. 29, 2014, the entire contents of which are hereby incorporated by reference.

FIELD OF TECHNOLOGY

The present disclosure relates generally to a battery charging method and, more particularly, to a method of adaptively adjusting charging modes of the battery.

BACKGROUND

A battery is usually initially charged by using a constant current till its voltage reaching a preset upper limit. Next, the charging mode will be immediately changed to the constant-voltage mode. During this charging mode, the battery voltage is held at the previous preset voltage limit, whereas the charging current will be gradually decreased to a preset lower limit. Once the charging current is dropped to the lower current limit, the whole charging processes will be definitely completed.

During the above-mentioned charging process, the state of degradation or aging of a battery is never considered. Undoubtedly, the degradation or aging of a battery can seriously deteriorate its performances and functions. As a result, a charging method that can complete the charging mission without damaging any performances or functions of a battery, will be the best choice. Nevertheless, in the conventional applications, a high preset current in the constant-current mode is usually used in order to acquire more electricity in a shorter charging time. It inevitably results in the premature decay of a battery due to high temperature effects, including the non-uniform temperature distribution with an over-preset difference between upper and lower limit values, the rise of the over-upper-limit temperature, the rise of the excessive change rates of temperature, and the local thermal concentration.

Additionally, there are the other four factors that significantly affect the life span of a battery, i.e. charging and discharging under lower limit of temperature, charging over upper limit of voltage, discharging under lower limit of voltage, and charging and discharging over the upper limit of current. In view of the above, there is still room to provide a better battery charging method.

SUMMARY

A method of diagnosing a battery and adaptively adjusting charging modes of the battery is provided, which comprises the steps of: initially charging the battery using a constant current mode, wherein the battery is charged by a fix current in the constant current mode; monitoring a deterioration index by a battery management system (BMS), the deterioration index including a highest temperature (Tempmax), an instantaneous temperature difference (ΔTemp), an instantaneous voltage difference (ΔV), an instantaneous internal resistance (IRmax), and a state of charge (SoC) of the battery, wherein Tempmax is a highest temperature among any of battery cells in the battery, Tempmin is a lowest temperature among any of the battery cells in the battery, ΔTemp is a difference of Tempmax and Temp min, Vmax is a highest voltage among any of the battery cells in the battery, V min is a lowest voltage among any of the battery cells in the battery, ΔV is a difference of Vmax and V min, and IRmax is a highest instantaneous internal resistance among any of the battery cells in the battery; and when Tempmax exceeds a predetermined temperature threshold: pausing charging the battery; charging the battery by a constant power charging mode when Tempmax becomes smaller than 90% of the predetermined temperature threshold, wherein the battery is charged by a fix electric power in the constant power mode; and charging the battery by the constant current charging mode when Tempmax becomes smaller than 50% of the predetermined temperature threshold.

Further scope of applicability of the present invention will become apparent from the detailed description given hereinafter However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION

The present invention will become more fully understood from the detailed description given hereinbelow and the accompanying drawings which are given by way of illustration only, and thus are not limitative of the present invention, and wherein:

FIGS. 1-5 are flowcharts illustrating a method of adaptively adjusting charging modes of the battery according to embodiments of the present disclosure.

DETAILED DESCRIPTION

The present invention will now be described in detail with reference to the accompanying drawings, wherein the same reference numerals will be used to identify the same or similar elements throughout the several views. It should be noted that the drawings should be viewed in the direction of orientation of the reference numerals.

The present invention provides a new battery charging method for a safer charging process and longer battery life-span. By using this method, a battery can be charged with more electricity but a lower rise of the temperature. This means that the less accumulated temperature effects will decay the life span of a battery, and the less failure risk will occur during its operation.

FIG. 1 shows a flowchart illustrating a method of adaptively adjusting charging modes of the battery according to an embodiment of the present disclosure. The method comprises the steps of: initially charging the battery using a constant current mode (step 11); monitoring a deterioration index by a battery management system (BMS)(step 12); and when Tempmax exceeds a predetermined temperature threshold (step 13): pausing charging the battery (step 14), charging the battery by a constant power charging mode (step 16) when Tempmax becomes smaller than 90% of the predetermined temperature threshold (step 15), and charging the battery by the constant current charging mode (step 18) when Tempmax becomes smaller than 50% of the predetermined temperature threshold (step 17).

In an embodiment, the battery is charged by a fix current in the constant current mode in step 11.

In an embodiment, the deterioration index includes a highest temperature (Tempmax), an instantaneous temperature difference (ΔTemp), an instantaneous voltage difference (ΔV), an instantaneous internal resistance (IRmax), and a state of charge (SoC) of the battery, wherein Tempmax is a highest temperature among any of battery cells in the battery, Tempmin is a lowest temperature among any of the battery cells in the battery, ΔTemp is a difference of Tempmax and Temp min, Vmax is a highest voltage among any of the battery cells in the battery, V min is a lowest voltage among any of the battery cells in the battery, ΔV is a difference of Vmax and V min, and IRmax is a highest instantaneous internal resistance among any of the battery cells in the battery.

In an embodiment, the predetermined temperature threshold in step 13 is 80° C.

In an embodiment, the battery is charged by a fix electric power in the constant power mode in step 16.

Figure 2:
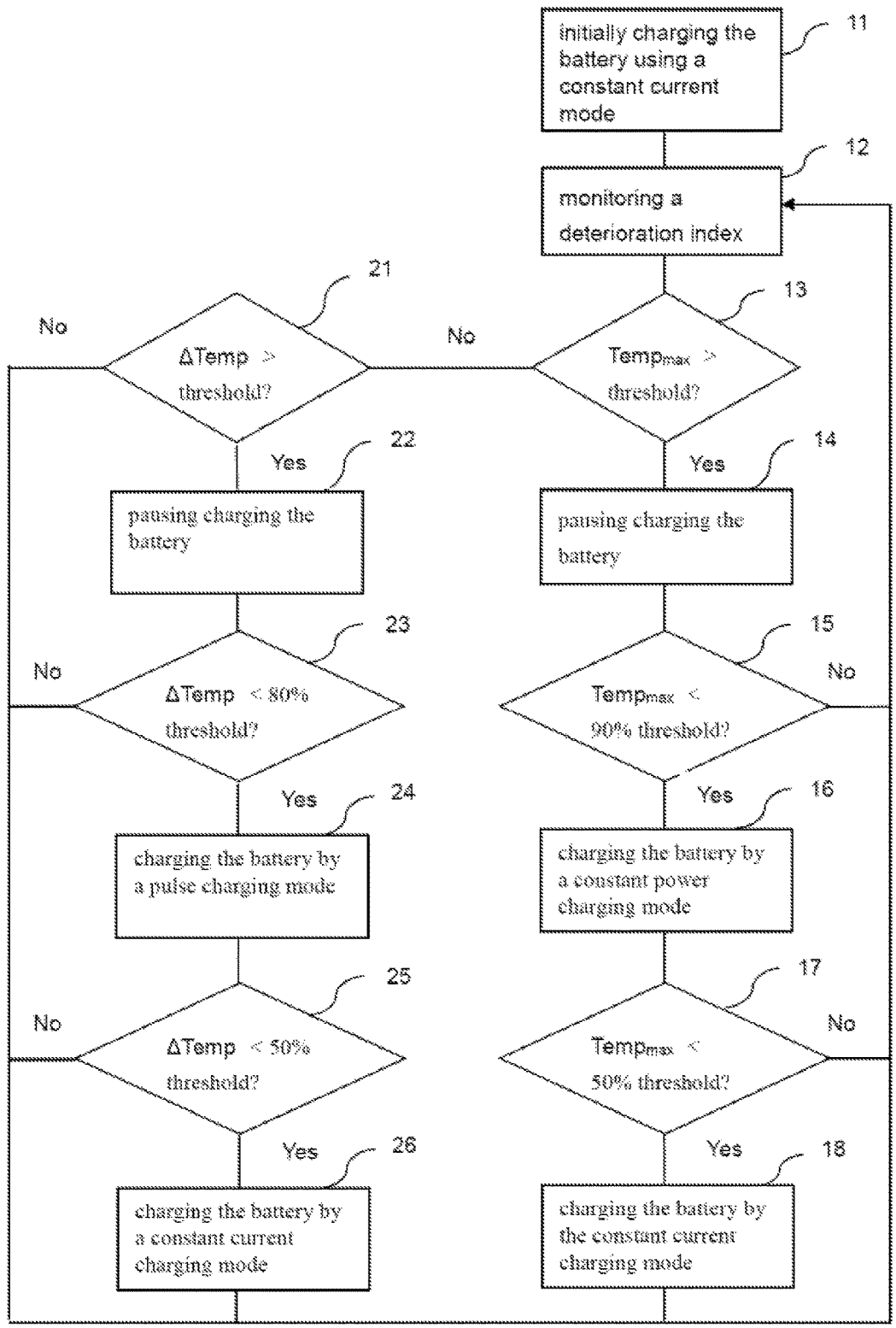

FIG. 2 shows a flowchart illustrating a method of adaptively adjusting charging modes of the battery according to another embodiment of the present disclosure, which further comprises: when ΔTemp exceeds a predetermined temperature-difference threshold and Tempmax does not exceed the predetermined temperature threshold (step 21): pausing charging the battery (step 22), charging the battery by a pulse charging mode (step 24) when ΔTemp becomes smaller than 80% of the predetermined temperature-difference threshold (step 23), and charging the battery by the constant current charging mode (step 26) when ΔTemp becomes smaller than 50% of the predetermined temperature-difference threshold (step 25).

In an embodiment, the predetermined temperature-difference threshold is 5° C. and the predetermined temperature threshold in step 21 is 80° C.

In an embodiment, the battery is charged with a predetermined on-off duty cycle in the pulse charging mode in step 24. In an embodiment, the on time of the on-off duty cycle with a pulse is 5 seconds, and the off time of the on-off duty cycle is 5 seconds.

Figure 3:
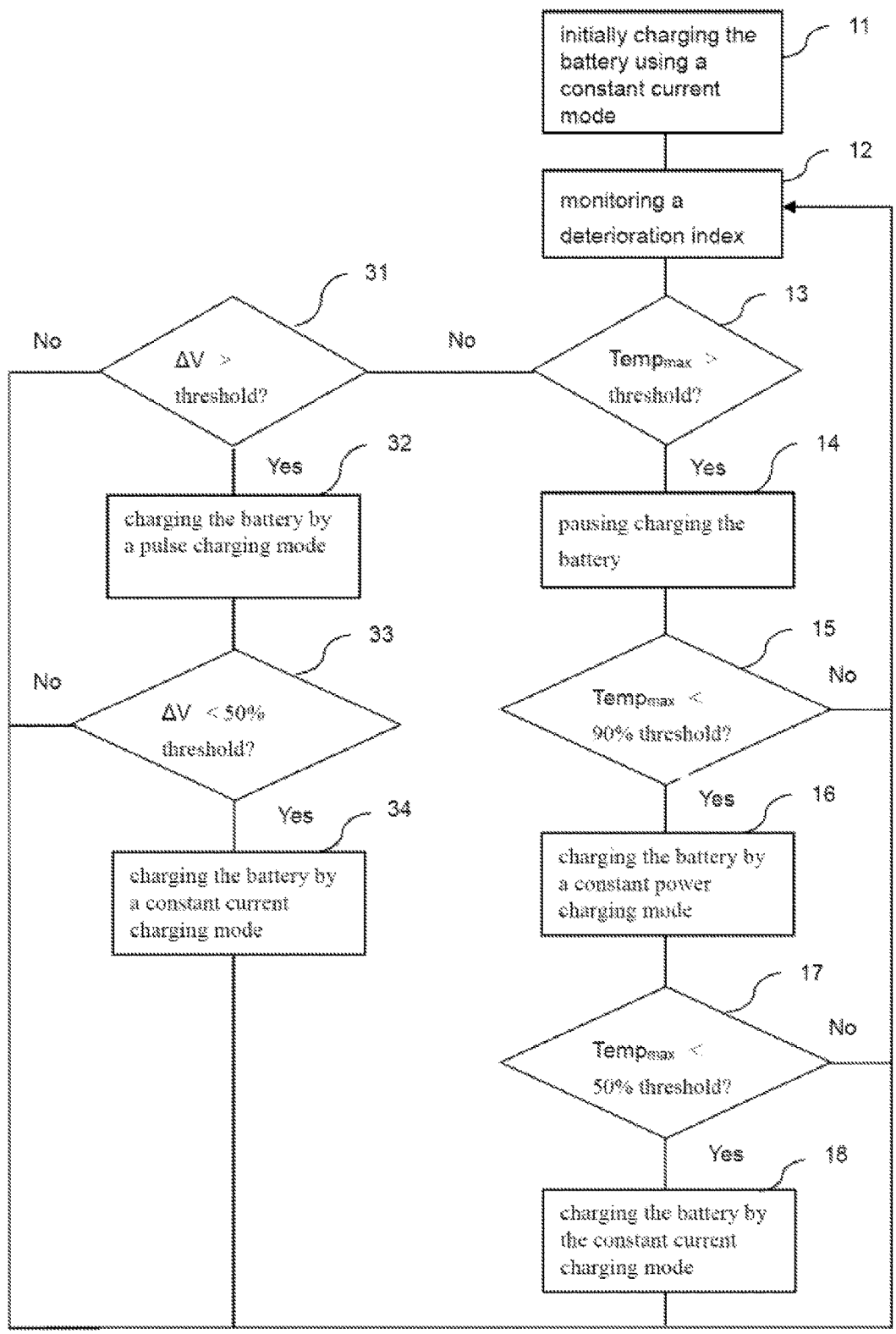

FIG. 3 shows a flowchart illustrating a method of adaptively adjusting charging modes of the battery according to another embodiment of the present disclosure, which further comprises: when ΔV exceeds a predetermined voltage-difference threshold, ΔTemp does not exceed a predetermined temperature-difference threshold, and Tempmax does not exceed the predetermined temperature threshold (step 31): charging the battery by a pulse charging mode (step 32), charging the battery by the constant current charging mode (step 34) when ΔV becomes smaller than 50% of the predetermined voltage-difference threshold (step 33).

In an embodiment, the predetermined voltage-difference threshold of the voltage difference in step 31 is 0.3 V, the predetermined temperature-difference threshold in step 31 is 5° C., and the predetermined temperature threshold in step 31 is 80° C.

In an embodiment, the battery is charged with a predetermined on-off duty cycle in the pulse charging mode in step 32. In an embodiment, the on time of the on-off duty cycle with a pulse is 5 seconds, and the off time of the on-off duty cycle is 5 seconds.

Figure 4:
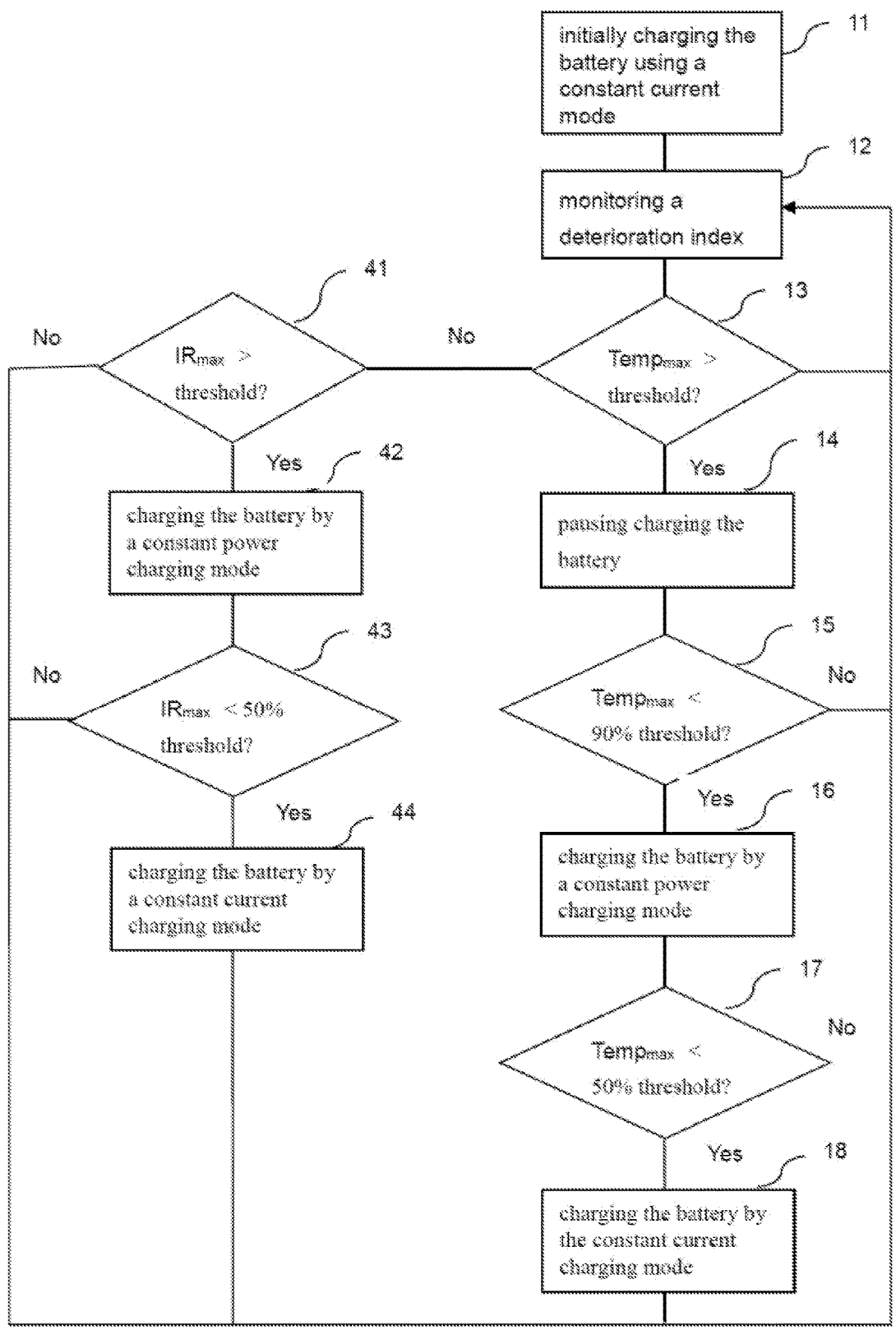

FIG. 4 shows a flowchart illustrating a method of adaptively adjusting charging modes of the battery according to another embodiment of the present disclosure, which further comprises: when IRmax exceeds a predetermined resistance threshold, ΔV does not exceed a corresponding predetermined voltage-difference threshold, ΔTemp does not exceed a predetermined temperature-difference threshold, and Tempmax does not exceed the predetermined temperature threshold (step 41): charging the battery by a constant power charging mode (step 42), and charging the battery by the constant current charging mode (step 44) when IRmax becomes smaller than 50% of the predetermined resistance threshold (step 43).

In an embodiment, the predetermined voltage-difference threshold in step 41 is 0.3 V, the predetermined resistance threshold in step 41 is 10 mΩ, the predetermined temperature-difference threshold in step 41 is 5° C., and the predetermined temperature threshold in step 41 is 80° C.

In an embodiment, the battery is charged by a fix electric power in the constant power mode in step 42.

Figure 5:
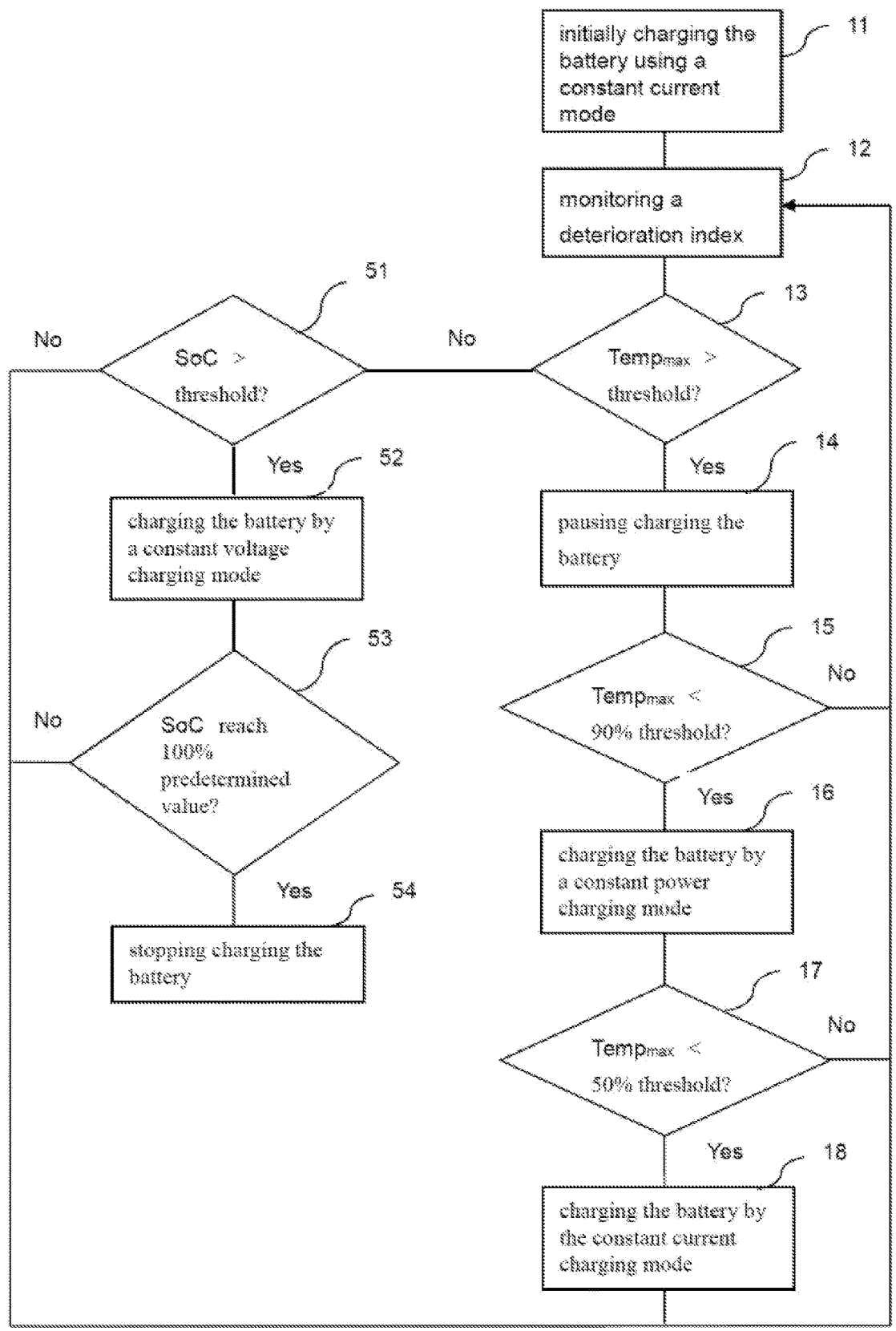

FIG. 5 shows a flowchart illustrating a method of adaptively adjusting charging modes of the battery according to another embodiment of the present disclosure, which further comprises: when SoC exceeds a predetermined state-of-charge threshold, IRmax does not exceed a predetermined resistance threshold, ΔV does not exceed a predetermined voltage-difference threshold, ΔTemp does not exceed a predetermined temperature-difference threshold, and Tempmax does not exceed a predetermined temperature threshold (step 51): charging the battery by a constant voltage charging mode (step 52), and stopping charging the battery (step 54) when SoC reaches 100% of the predetermined state-of-charge value (step 53).

In an embodiment, the predetermined state-of-charge threshold in step 51 is 95% of predetermined value, the predetermined voltage-difference threshold in step 51 is 0.3 V, the predetermined resistance threshold in step 51 is 10 mΩ, the predetermined temperature-difference threshold in step 51 is 5° C., and the predetermined temperature threshold in step 51 is 80° C.

In an embodiment, the battery is charged by a fix voltage in the constant voltage mode in step 52.

In some embodiments, any two or more of the processes in FIGS. 1-5 can be combined together as a method of adaptively adjusting charging modes of the battery. In some embodiments, the deterioration indexes can be pre-prioritized so that one of the two or more of the processes in FIGS. 1-5 (when combined together as a method of adaptively adjusting charging modes of the battery) with the highest priority will be performed when more than one processes can be performed in the current state of the battery.

In view of the above, in the present disclosure, the current state of battery is diagnosed first and is then used as a basis for adaptively adjusting the optimal charging modes, so that the battery can be charged in an optimal mode based on the current state of the battery. Therefore, the life span of the battery can be significantly extended.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of diagnosing a battery and adaptively adjusting charging modes of the battery, the method comprising the steps of:
    initially charging the battery using a constant current mode, wherein the battery is charged by a fix current in the constant current mode;
    monitoring a deterioration index by a battery management system (BMS), the deterioration index including a highest temperature ($Temp_{max}$), an instantaneous temperature difference ($\Delta Temp$), an instantaneous voltage difference ($\Delta V$), an instantaneous internal resistance ($IR_{max}$), and a state of charge (SoC) of the battery, wherein $Temp_{max}$ is a highest temperature among any of battery cells in the battery, $Temp_{min}$ is a lowest temperature among any of the battery cells in the battery, $\Delta Temp$ is a difference of $Temp_{max}$ and $Temp_{min}$, $V_{max}$ is a highest voltage among any of the battery cells in the battery, $V_{min}$ is a lowest voltage among any of the battery cells in the battery, $\Delta V$ is a difference of $V_{max}$ and $V_{min}$, and $IR_{max}$ is a highest instantaneous internal resistance among any of the battery cells in the battery; and when $Temp_{max}$ exceeds a predetermined temperature threshold:
  pausing charging the battery;
  charging the battery by a constant power charging mode when $Temp_{max}$ becomes smaller than 90% of the predetermined temperature threshold, wherein the battery is charged by a fix electric power in the constant power mode; and
  charging the battery by the constant current charging mode when $Temp_{max}$ becomes smaller than 50% of the predetermined temperature threshold.

2. The method of claim 1, wherein the predetermined temperature threshold is 80° C.

3. The method of claim 1, further comprising:
when $\Delta Temp$ exceeds a predetermined temperature-difference threshold and $Temp_{max}$ does not exceed the predetermined temperature threshold:
  pausing charging the battery;
  charging the battery by a pulse charging mode when $\Delta Temp$ becomes smaller than 80% of the predetermined temperature-difference threshold, wherein the battery is charged with a predetermined on-off duty cycle in the pulse charging mode; and
  charging the battery by the constant current charging mode when $\Delta Temp$ becomes smaller than 50% of the predetermined temperature-difference threshold.

4. The method of claim 3, wherein the predetermined temperature-difference threshold is 5° C. and the predetermined temperature threshold is 80° C.

5. The method of claim 3, wherein an on time of the on-off duty cycle is 5 seconds, and an off time of the on-off duty cycle is 5 seconds.

6. The method of claim 1, further comprising:
when $\Delta V$ exceeds a predetermined voltage-difference threshold, $\Delta Temp$ does not exceed a predetermined temperature-difference threshold, and $Temp_{max}$ does not exceed the predetermined temperature threshold:
  charging the battery by a pulse charging mode, wherein the battery is charged with a predetermined on-off duty cycle in the pulse charging mode; and
  charging the battery by the constant current charging mode when $\Delta V$ becomes smaller than 50% of the predetermined voltage-difference threshold.

7. The method of claim 6, wherein the predetermined voltage-difference threshold of the voltage difference is 0.3 V, the predetermined temperature-difference threshold is 5° C., and the predetermined temperature threshold is 80° C.

8. The method of claim 6, wherein an on time of the on-off duty cycle is 5 seconds, and an off time of the on-off duty cycle is 5 seconds.

9. The method of claim 1, further comprising:
when $IR_{max}$ exceeds a predetermined resistance threshold, $\Delta V$ does not exceed a corresponding predetermined voltage-difference threshold, $\Delta Temp$ does not exceed a predetermined temperature-difference threshold, and $Temp_{max}$ does not exceed the predetermined temperature threshold:
  charging the battery by a constant power charging mode, wherein the battery is charged by a fix electric power in the constant power mode; and
  charging the battery by the constant current charging mode when $IR_{max}$ becomes smaller than 50% of the predetermined resistance threshold.

10. The method of claim 9, wherein the predetermined voltage-difference threshold is 0.3 V, the predetermined resistance threshold is 10 mΩ, the predetermined temperature-difference threshold is 5° C., and the predetermined temperature threshold is 80° C.

11. The method of claim 1, further comprising:
when SoC exceeds a predetermined state-of-charge threshold, $IR_{max}$ does not exceed a predetermined resistance threshold, $\Delta V$ does not exceed a predetermined voltage-difference threshold, $\Delta Temp$ does not exceed a predetermined temperature-difference threshold, and $Temp_{max}$ does not exceed a predetermined temperature threshold:
  charging the battery by a constant voltage charging mode, wherein the battery is charged by a fix voltage in the constant voltage mode;
  stopping charging the battery when SoC reaches 100% of the predetermined state-of-charge value.

12. The method of claim 11, wherein the predetermined state-of-charge threshold is 95%, the predetermined voltage-difference threshold is 0.3 V, the predetermined resistance threshold is 10 mΩ, the predetermined temperature-difference threshold is 5° C., and the predetermined temperature threshold is 80° C.

* * * * *